UNITED STATES PATENT OFFICE.

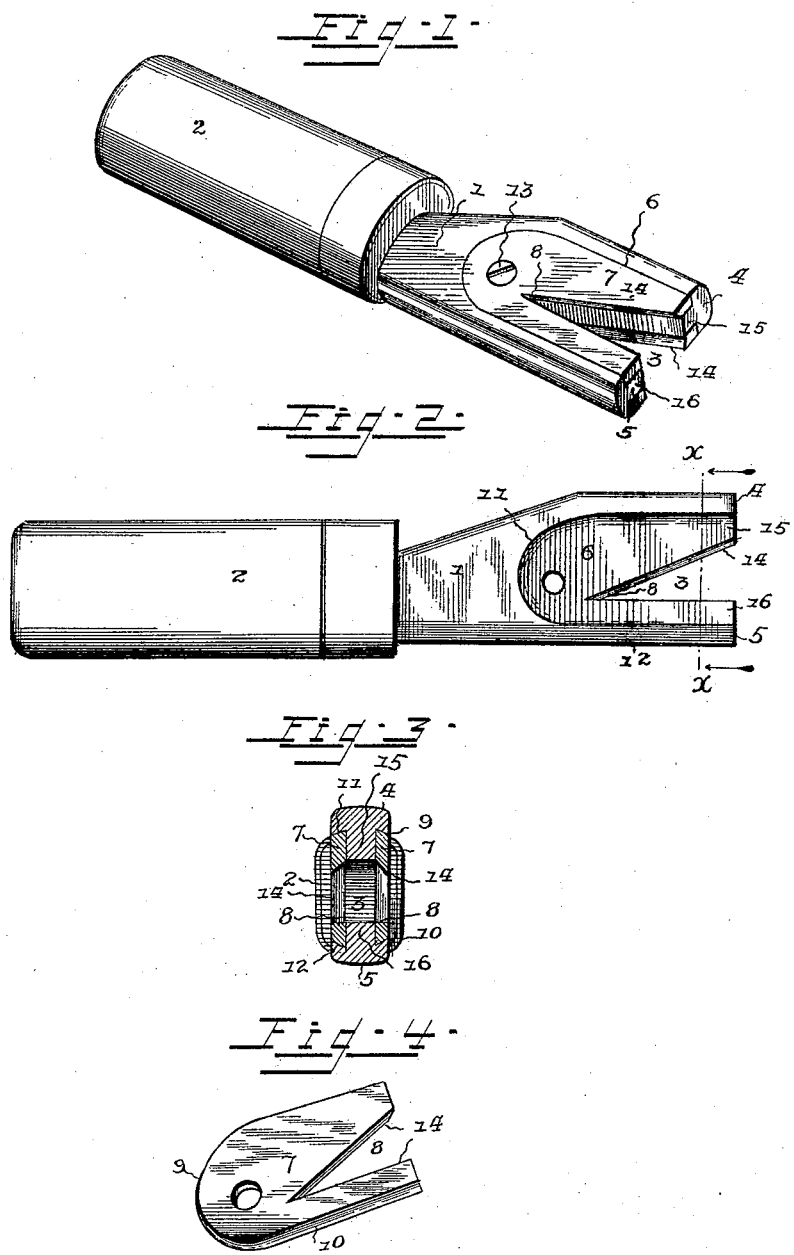

JAMES T. FOSTER AND JOHN B. MILLER, OF GRAPEVINE, TEXAS.

HOE-SHARPENER.

SPECIFICATION forming part of Letters Patent No. 615,837, dated December 13, 1898.

Application filed March 7, 1898. Serial No. 672,888. (No model.)

*To all whom it may concern:*

Be it known that we, JAMES T. FOSTER and JOHN B. MILLER, citizens of the United States, residing at Grapevine, in the county of Tarrant and State of Texas, have invented a new and useful Hoe-Sharpener, of which the following is a specification.

This invention relates to sharpening-tools, and is especially designed for sharpening the blades of hoes and similar implements.

The object of our invention is to provide a device of this character which can be quickly and effectively used to sharpen implements of various character and, further, to provide the device with sharpening-blades which are removably secured thereto.

The essential feature of our invention comprises a metallic shank fitted with a suitable handle, the shank being provided with a substantially V-shaped slot or opening and a pair of sharpening-blades, each of which is provided with a similar slot that is adapted to register with the slot in the shank.

Further objects and advantages of our improved sharpening-tool will be hereinafter more fully shown and described, and particularly pointed out in the appended claims.

In the drawings, Figure 1 is a perspective view of our invention. Fig. 2 is a side elevation with one of the sharpening-blades removed. Fig. 3 is a transverse sectional view taken on the line $x$ $x$, Fig. 2. Fig. 4 is a detail perspective view of one of the sharpening-blades.

Corresponding parts in the several figures are denoted by like characters of reference.

Referring to the drawings, 1 designates a metallic shank which is provided at one end with a wooden or other suitable handle 2. The general shape of the shank 1 is preferably rectangular at one end and reduced at the other end to receive a suitable handle, substantially as shown. This shank 1 is provided with a substantially V-shaped slot or opening 3, which extends longitudinally thereof, forming upper and lower jaws 4 and 5, respectively. This slot is disposed with its widest part at the outer extremity of the shank, having the lower jaw 5 thereof parallel with the under edge of the shank, while the upper jaw 4 extends downwardly from the outer extremity of the shank and meets the lower jaw, thus forming an acute-angled slot for the reception and guidance of the implement to be sharpened. The opposite faces of the shank adjacent to the slot 3 are each recessed, as shown at 6, to receive the sharpening-blades 7 and retain them therein flush with the face of the shank.

The sharpening-blades 7 are provided in pairs and are fitted to the opposite faces of the shank 2. They are each provided with a slot 8, similar to the slot in the shank 1, and are adapted to register therewith, as shown. The upper and lower edges are preferably beveled, as shown at 9 and 10, and the edges of the recesses are similarly beveled, as shown at 11 and 12, which constitute a suitable groove or guide to retain the blades in position. To further hold the blades against movement or displacement, we prefer to use a suitable screw 13. By this arrangement the blades can be quickly and easily removed and a new one placed in position for use.

The sharpening edge of the blade is preferably formed upon the upper or slanting jaw 4, which is beveled, as at 14, forming the sharp edge thereof upon the outer side of the blade.

The disposition of the recesses 6 form webs 15 and 16, which constitute substantial braces for the jaws of the sharpening-blades, as will be readily understood.

The upper edges of the lower jaws of the sharpening-blades 7 are preferably arranged flush with the upper face of the lower web 16, thus forming a flat surface upon which the implement to be sharpened may be guided.

The operation of our invention is as follows: The edge of the implement to be sharpened is placed in the slot 3 as far as it will go, and the device is then reciprocated quickly from one end to the other of the implement to be sharpened, the knifed edges of the blades 7 operating to provide a sharp edge upon the implement, care being taken to keep the lower jaw of the device pressed evenly against the lower face of the implement operated upon.

As changes in the form, proportion, and minor details may be made without departing from the spirit and scope or sacrificing any of the advantages of our invention, we do not therefore wish to be understood as limiting ourselves to the precise construction and arrangement as herein shown and described.

Having thus described our invention, we claim and desire to secure by Letters Patent—

1. A sharpening device, comprising a shank having a handle at one end and a substantially V-shaped slot at the other end, a pair of sharpening-blades, each blade having a slot similar to the slot in the shank and adapted to register therewith, and means for securing the sharpening-blades upon the shank at each side, substantially as and for the purpose set forth.

2. A sharpening device for hoes and the like, comprising a shank having a handle at one end and a substantially V-shaped slot at the other end thereof, said slot extending longitudinally and from side to side of the shank and opening outward forming a guide to receive the implement to be sharpened, a pair of sharpening-blades having similar slots therein, recesses provided in the opposite faces of the shank to receive the sharpening-blades and retain them therein flush with the face of the shank, and a single screw to fasten the blades upon the shank, substantially as shown and described.

In testimony that we claim the foregoing as our own we have hereto affixed our signatures in the presence of two witnesses.

JAS. T. FOSTER.
JNO. B. MILLER.

Witnesses:
L. T. MARTIN,
C. C. ESTILL.